United States Patent
Feng et al.

(10) Patent No.: US 10,710,301 B2
(45) Date of Patent: Jul. 14, 2020

(54) MATERIAL SETS

(71) Applicant: Hewlett-Packard Development Company, L.P., Houston, TX (US)

(72) Inventors: Yi Feng, San Diego, CA (US); Erica Montei Fung, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 218 days.

(21) Appl. No.: 16/073,289

(22) PCT Filed: May 13, 2016

(86) PCT No.: PCT/US2016/032322
§ 371 (c)(1),
(2) Date: Jul. 26, 2018

(87) PCT Pub. No.: WO2017/196364
PCT Pub. Date: Nov. 16, 2017

(65) Prior Publication Data
US 2019/0039295 A1    Feb. 7, 2019

(51) Int. Cl.
| B29C 64/165 | (2017.01) |
| B33Y 70/00 | (2020.01) |
| B33Y 30/00 | (2015.01) |
| B33Y 80/00 | (2015.01) |
| C08K 3/04 | (2006.01) |

(Continued)

(52) U.S. Cl.
CPC ............ *B29C 64/165* (2017.08); *B33Y 30/00* (2014.12); *B33Y 70/00* (2014.12); *B33Y 80/00* (2014.12); *C08K 3/04* (2013.01); *C08K 3/08* (2013.01); *C08K 7/20* (2013.01); *B29K 2077/00* (2013.01); *B29K 2105/0044* (2013.01); *B29K 2105/16* (2013.01); *B29K 2105/165* (2013.01);

(Continued)

(58) Field of Classification Search
None
See application file for complete search history.

(56) References Cited

U.S. PATENT DOCUMENTS

| 5,169,871 A | 12/1992 | Hughes et al. |
| 6,048,954 A | 4/2000 | Barlow et al. |

(Continued)

FOREIGN PATENT DOCUMENTS

| CN | 1255887 | 6/2000 |
| CN | 1817942 | 8/2006 |

(Continued)

OTHER PUBLICATIONS

Mousah, A. A., Cardiff University, Jun. 2011; Effects of Filler Content and Coupling Agents on the Mechanical Properties and Geometrical Accuracy of Selective Laser Sintered Parts in Glass Bead-filled Polyamide 12 Composites.

*Primary Examiner* — Mary Lynn F Theisen
(74) *Attorney, Agent, or Firm* — HPI Patent Department

(57) ABSTRACT

The present disclosure is drawn to material sets for 3-dimensional printing, 3-dimensional printing systems, and 3-dimensional printed parts. A material set can include a powder bed material of composite particles including glass beads coated with polyamide-12 polymer. The composite particles can have an average particle size from 20 μm to 200 μm, and the polyamide-12 polymer can include greater than 80 meq/g carboxylic end groups and less than 40 meq/g amino end groups. The fusing agent can include an energy absorber capable of absorbing electromagnetic radiation to produce heat.

15 Claims, 2 Drawing Sheets

(51) Int. Cl.
*C08K 3/08* (2006.01)
*C08K 7/20* (2006.01)
*B29K 105/16* (2006.01)
*B29K 77/00* (2006.01)
*B29K 105/00* (2006.01)

(52) U.S. Cl.
CPC .............. *B29K 2105/251* (2013.01); *C08K 2003/0887* (2013.01); *C08K 2201/005* (2013.01)

(56) References Cited

U.S. PATENT DOCUMENTS

| | | | |
|---|---|---|---|
| 6,245,281 B1 | 6/2001 | Scholten et al. |
| 7,148,286 B2 | 12/2006 | Baumann et al. |
| 7,211,615 B2 | 5/2007 | Baumann et al. |
| 7,468,405 B2 | 12/2008 | Allen et al. |
| 7,887,740 B2 | 2/2011 | Simon et al. |
| 7,906,063 B2 | 3/2011 | Monsheimer et al. |
| 8,066,933 B2 | 11/2011 | Monsheimer et al. |
| 8,124,686 B2 | 2/2012 | Loyen et al. |
| 8,173,258 B2 | 5/2012 | Monsheimer et al. |
| 8,865,053 B2 | 10/2014 | Monsheimer et al. |
| 2004/0232583 A1 | 11/2004 | Monsheimer |
| 2006/0244169 A1 | 11/2006 | Monsheimer et al. |
| 2008/0122141 A1 | 5/2008 | Bedal et al. |
| 2013/0012643 A1 | 1/2013 | Monsheimer et al. |
| 2014/0141166 A1 | 5/2014 | Rodgers |
| 2015/0273572 A1 | 10/2015 | Ederer et al. |
| 2016/0107337 A1 | 4/2016 | Acerbo et al. |

FOREIGN PATENT DOCUMENTS

| | | |
|---|---|---|
| CN | 1976799 | 6/2007 |
| JP | 2005297325 | 10/2005 |
| WO | WO-9511006 | 4/1995 |
| WO | WO-2014209994 | 12/2014 |
| WO | WO-2015132510 | 9/2015 |
| WO | WO-2016060469 | 4/2016 |
| WO | WO-2016068899 A1 | 5/2016 |

MATERIAL SETS

BACKGROUND

Methods of 3-dimensional (3D) digital printing, a type of additive manufacturing, have continued to be developed over the last several years. Various methods for 3D printing have been developed, including heat-assisted extrusion, selective laser sintering, photolithography, as well as others. In general, 3D printing technology improves the product development cycle by allowing rapid creation of prototype models for reviewing and testing.

Figure 1:
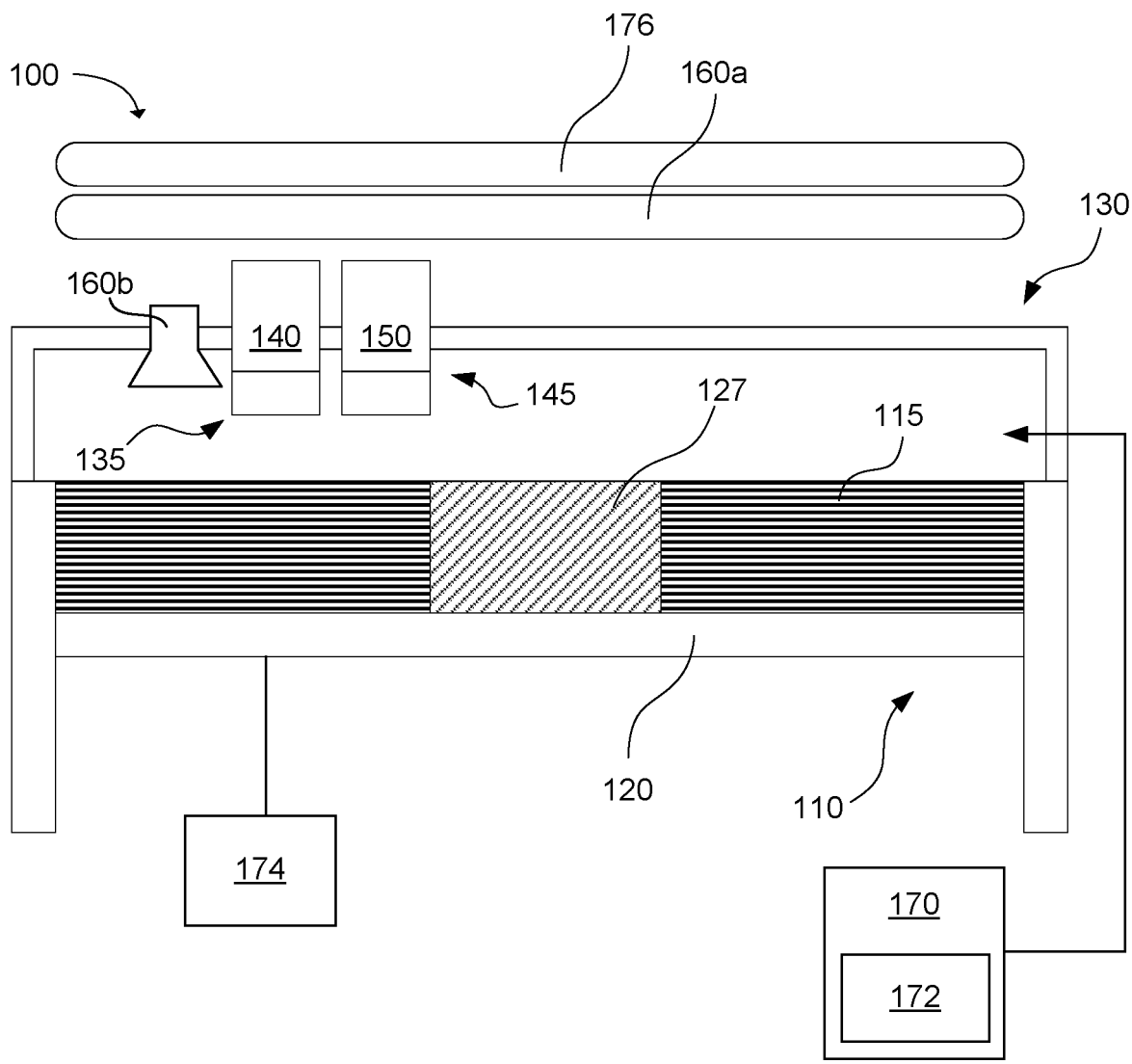
FIG. 1 is a schematic view of an example 3-dimensional printing system in accordance with the present disclosure.

The figures depict several examples of the presently disclosed technology. However, it should be understood that the present technology is not limited to the examples depicted.

DETAILED DESCRIPTION

The present disclosure is drawn to the area of 3-dimensional printing. More specifically, the present disclosure provides material sets, systems for printing 3-dimensional parts, and 3-dimensional printed parts. In an exemplary printing process, a thin layer of powder bed material which includes composite particles of glass beads coated with polyamide-12 polymer can be spread on a powder bed. A print head, such as a fluid jet print head, may then be used to print a fusing agent over portions of the powder bed corresponding to a thin layer of the three dimensional object to be formed. Then, the powder bed with the fusing agent applied to the powder bed can be exposed to an electromagnetic radiation source, e.g., typically the entire bed. The fusing agent present where the part is being formed may typically absorb more energy from the electromagnetic radiation than the unprinted powder. The absorbed electromagnetic radiation can then be converted to thermal energy, causing the printed portions of the powder to melt and coalesce. This forms a solid layer. After the first layer is formed, a new thin layer of polymer powder can be spread over the powder bed and the process can then be repeated to form additional layers until the 3-dimensional part is printed. In accordance with examples of the present disclosure, typically, the composite particles are preheated prior to introduction to the powder bed, and furthermore, are heated still further once on the powder bed. As an example, the composite particles may be preheated at from 110° C. to 140° C., and once on the platen base of the powder bed, the polyamide-12 polymer may be heated to from 140° C. to 220° C. (e.g., heat provided by the platen base below as well as from overhead heating sources). It is these high temperatures that can cause thermal degradation of the polyamide-12 polymer generally, and thus, limit the recyclability of unused (unfused) powder over multiple part builds. However, in accordance with examples of the present disclosure, the recyclability of the composite particles described herein can be improved.

In accordance with this, in some examples of the present disclosure, a material set can include a powder bed material, including composite particles of glass beads coated with polyamide-12 polymer. The composite particles can have an average particle size from 20 μm to 200 μm (particle size values herein obtained using laser scattering, Malvern Mastersizer S, version 2.18). The polyamide-12 polymer can include greater than 80 meq/g carboxylic end groups and less than 40 meq/g amino end groups. The material set may further include a fusing agent comprising an energy absorber capable of absorbing electromagnetic radiation to produce heat. In one example, the polyamide-12 polymer coating can have a solution viscosity from 1.7 to 1.9 at room temperature as measured in 99.5 wt % m-cresol using ISO 307 method, and the polyamide-12 polymer can further have a solution viscosity that changes no more than about 5% (or stays about the same) when exposed to 165° C. for 20 hours.

In another example, a 3-dimensional printing system can include a powder bed with a powder bed material including composite particles of glass beads coated with polyamide-12 polymer. The composite particles can have an average particle size from 20 μm to 200 μm. The polyamide-12 polymer can include greater than 80 meq/g carboxylic end groups and less than 40 meq/g amino end groups. The system can further include a fluid jet printer comprising a fluid jet pen in communication with a reservoir of a fusing agent to print the fusing agent onto the powder bed. The fusing agent may include an energy absorber capable of absorbing electromagnetic radiation to produce heat. The system can further include a fusing electromagnetic energy source, e.g., a fusing lamp, to expose the powder bed material to electromagnetic radiation sufficient to fuse polyamide-12 polymer (coated on the composite particles) that has been printed with the fusing agent. In some more specific examples, the polyamide-12 polymer may have a solution viscosity from 1.7 to 1.9 at room temperature. Furthermore, the solution viscosity profile can be such that the polyamide-12 polymer changes no more than about 5% (or stays about the same) when exposed to 165° C. for 20 hours.

In another example, a 3-dimensional printed part can include a part body comprising multiple layers of energy absorber and powder bed material fused together. The powder bed material may include composite particles of glass beads coated with polyamide-12 polymer, with an average particle size from 20 μm to 200 μm. The polyamide-12 polymer can include greater than 80 meq/g carboxylic end groups and less than 40 meq/g amino end groups. In certain specific examples, the polyamide-12 polymer may have a solution viscosity from 1.7 to 1.9 at room temperature. Furthermore, the solution viscosity profile can be such that the polyamide-12 polymer changes no more than about 5% (or stays about the same) when exposed to 165° C. for 20 hours. Individual layers of the multiple layers may have a thickness from 20 μm to 200 μm. In certain specific examples, the X-Y axis elongation can be from 5% to 30% and/or the Z-axis elongation can be from 2% to 20%. The tensile strength in the X-Y axis and/or Z axis can be from 25 MPa to 45 MPa. Additionally, the tensile modulus in the X-Y axis and/or the Z axis can be from 2000 MPa to 3500 MPa.

As mentioned, the powder bed material can include composite particles of glass beads coated with polyamide-12 polymer with an average composite particle size from 20 μm to 200 μm. The "particle size" refers to the diameter of spherical particles, or to the longest dimension of non-spherical particles. In further detail, and in accordance with certain specific examples, the particle size distribution of the composite particles can be as follows: D50 can be from 30 μm to 70 μm, from 40 μm to 60 μm, or about 50 μm; D10 can be from 15 μm to 45 μm, from 20 μm to 40 μm, or about 30 μm; and D90 can be from 70 μm to 90 μm, from 75 μm to 85 μm, or about 80 μm. "D50" is defined as the median weight. "D10" is defined as the tenth-percentile by weight of powder that is below a given particle size, e.g., from 20 μm to 50 μm. "D90" is defined as the ninetieth-percentile by weight of powder that is below a given particle size, e.g., 75 μm to 100 μm. Furthermore, the polyamide-12 polymer coating can have a melting or softening point from about 160° C. to about 200° C., or about 170° C. to about 190° C. In further examples, the polyamide-12 polymer of the coating can have a melting or softening point from about 182° C. to about 189° C.

In further detail, as mentioned, the polyamide-12 powder can include greater than 80 meq/g carboxylic end groups (or can include greater than 90 meq/g) and can include less than 40 meq/g amino end groups (or can include less than 30 meq/g). It is noted that by "less than 40 meq/g," this includes examples where there are essentially no (0 meq/g) amino end groups. As a practical matter and as a technical limit, detection of less than 2 meq/g of amino end groups can be difficult to determine. Thus, by essentially no amino end groups, this is defined to include no detectable amino end groups, e.g., less than 2 meq/g. However, in some examples, there may be from 2 meq/g to less than 40 meq/g, or from 5 meq/g to less than 30 meq/g amino end groups. On the other hand, the upper limit of the carboxylic end groups can be limited by a capacity of end group locations, but in one example, the carboxylic end groups can be from greater than 80 meq/g to 200 meq/g, or from 90 meq/g to 200 meq/g, or from greater than 80 meq/g to 170 meq/g, or from 90 meq/g to 170 meq/g. End group values can be determined by titration.

There are several benefits to providing glass beads coated with the polyamide-12 polymer of the present disclosure. For example, in some instances, if the polyamide-12 polymer was added as a standalone powder admixed with the glass beads, glass bead/polymer particles segregation may occur in the powder bed. For example, as the powder bed material is spread using a knife or roller, glass bead would interact with the spreading device differently than polyamide-12 polymer powder, causing a less than homogenous mixture of glass beads and polyamide-12 polymer at the surface. Additionally, glass beads with a much higher density than PA12 particles may tend to separate downward through the larger voids provided by larger particles. Furthermore, polymer-coated glass beads as described herein can provide certain improved physical properties for the printed image, including but not limited to, elongation before the part breaks, as well as part strength and/or modulus. These improvements can be seen in some examples in one or both of the printed X-Y axis (horizontal axis aligned with printing layers) or the Z axis (vertical axis perpendicular to the printing layers).

With specific reference to the glass beads, their particle size can range from 10 μm to 60 μm. In accordance with certain specific examples, the particle size distribution of the glass beads (excluding the polymer coating) can be as follows: D50 can be from 10 μm to 50 μm, from 25 μm to 50 μm, or about 40 μm; D10 can be from 10 μm to 40 μm, from 15 μm to 35 μm, or about 25 μm; and D90 can be from 30 μm to 70 μm, from 40 μm to 60 μm, or about 50 μm. The glass beads can be essentially spherical on average or can average an asymmetrical aspect ratio from greater than 1:1 to about 2:1 (longest to shortest axis by length).

The molecular weight of the polyamide-12 powder can be characterized using relative solution viscosity (or "solution viscosity" for brevity) as a proxy for molecular weight. "Solution viscosity" is defined by combing 0.5 wt % polyamide-13 powder with 99.5 wt % M-cresol and measuring the viscosity of the admixture at room temperature. Further details for determining solution viscosity under this measurement protocol are described in International Standard ISO 307, Fifth Edition, 2007-05-15. In some detail, the solution viscosity measurement can be used as a proxy for molecular weight, and essentially measures the viscosity using a capillary viscometer. The measurement is based on the time it takes for a certain volume of fluid (solvent or solution) to pass through a capillary viscometer under its own weight or gravity compared to the same fluid (solvent or solution) admixed with a small amount of the polymer powder. The higher the viscosity, the longer it takes for the fluid to pass through. Thus, solution viscosity is defined as a ratio that compares the time for a fluid with the polymer powder to pass through the capillary compared to the time it takes for the fluid alone to pass therethrough. Thus, the fluid with the polymer powder is more viscous than the pure fluid, so the ratio is always a number greater than 1. In accordance with the present disclosure, by way of example, if it takes m-cresol solvent 120 second to go through the capillary viscometer, and it takes solution of 0.5 wt % of polyamide-12 in 99.5 wt % m-cresol 180 second to go through the same capillary viscometer, then the relative solution viscosity is 180/120 which is 1.5.

Thermal degradation of the polyamide-12 polymer being tested can further be determined using the solution viscosity measurement (ISO 307) after a predetermined amount of time at a specific temperature profile. For example, in accordance with one example of the present disclosure, because the powder may typically be exposed to heat during 3-dimensional modeling or printing on the order of about 120° C. to 160° C. (e.g., feed powder temperature about 120-140° C., platform heater about 145-160° C., powder temperature from heating lamps during printing at about 155° C. to 165° C., etc.), one reactivity test may include exposing the powder to 165° C. for 20 hours with an air environment (which may be slightly harsher than typical printing conditions). This is not to say that higher temperatures may not otherwise be used, as in some examples, temperatures up to 220° C. may be used. However, for consistency in determining solution viscosity before and after exposure to prolonged heat, the profile of 165° C. for 20 hours in air is used when discussing solution viscosity values. Thus, under these conditions, thermal degradation can be evaluated by determining a change (typically an increase due to continue polymerization through reactive end groups of the polyamide-12) in solution viscosity to establish relative solution viscosity stability, which correlates to relative molecular weight stability, e.g., change in solution viscosity indicates relative molecular weight stability. A solution viscosity range at room temperature may be about 1.7 to 1.9, and after exposure to heat as described herein, the solution viscosity remains the same or changes by a value no greater than about 5% at 165° C. for 20 hours in air.

In further detail regarding molecular weight stability (characterized using solution viscosity stability as a proxy for measuring molecular weight and change in molecular weight after exposure to heat for a period of time), the chemistry of relative long polyamide-12 polymer chains undergo oxidation or thermal degradation when exposed to heat. As the polymer breaks down and degrades, it becomes apparent by significant yellowing. In accordance with examples of the present disclosure, by preparing polyamide-12 polymer having a molecular weight range with a solution viscosity from 1.7 to 1.9, as well as by using greater than 80 meq/g carboxylic end groups and less than 40 meq/g amino end groups therewith, at 165° C./20 hrs/air, the thermal degradation can be largely counterbalanced by the reactivity of the end groups. Thus, on average, shorter chain polymers that may be formed by thermal degradation of the polyamide-12 can likewise react with other oxidized or non-oxidized polymer chains using the end groups. By balancing the breakdown and the reactivity out, the average polymer chain length (e.g., molecular weight or solution viscosity) can remain similar to the initial polymer chain length (e.g., molecular weight or solution viscosity). In other words, the polyamide-12 polymer described herein has a molecular weight or solution viscosity with a range that is useful for 3-dimensional printing described herein, and the reactivity of the polyamide-12 polymer end groups is such that it is similarly matched to compensate for thermal degradation (which inherently lowers the molecular weight), e.g., remain same or changes no greater than about 5% at 165° C. for 20 hours in air. In one specific example, the solution viscosity may be initially at room temperature from 1.7 to 1.9 and may be only minimally increase after exposure to 165° C. for 20 hours in air, e.g., remain same or changes no greater than about 5%, e.g. at initial solution viscosity of 1.9 may stay about the same or change within a range of about 1.8 to about 2, or an initial solution viscosity of 1.78 may stay about the same or change within a range of about 1.69 to about 1.87.

In certain examples, the composite particles of glass beads coated with polyamide-12 polymer can have a variety of shapes, such as substantially spherical particles or irregularly-shaped particles. In either case, the longest axis to shortest axis of the particles can have an average aspect ratio of less than 2:1 (longest axis to shortest axis). More typically, the aspect ratio may be closer to about 1:1.

In some examples, the composite particles may also be capable of being formed into 3D printed parts with a resolution of 20 μm to 200 μm, or in some examples, from 20 μm to 200 μm. As used herein, "resolution" refers to the size of the smallest feature that can be formed on a 3D printed part. Resolution can be improved within this range by using smaller particles within the range. The polymer powder can form layers from about 20 μm to about 200 μm thick, allowing the fused layers of the printed part to have roughly the same thickness. This can provide a resolution in the Z axis direction of about 20 μm to about 200 μm. The composite particles can also have a sufficiently small particle size and sufficiently regular particle shape to provide about 20 μm to about 200 μm resolution along the x-axis and y-axis.

In further detail, powder bed material with the composite particles can be further modified with the inclusion of an anti-oxidant blended therewith. By reducing overall thermal degradation of the polyamide-12 polymer using a blended anti-oxidant powder, the reactivity of the end groups can be formulated to be less aggressively reactive, as some thermal degradation is reduced by the presence of the anti-oxidant. Thus, the formulation of the powder bed material can be such that at 165° C. for 20 hours in air, the thermal degradation rate of the polyamide-12 chains, the reactivity of the end groups, and anti-oxidation effectiveness of the anti-oxidant can be matched such that the solution viscosity may increase to no more than about 5% (from initial solution viscosity to solution viscosity after heating). In certain examples, the anti-oxidant can be sterically hindered phenol derivatives. The anti-oxidant can, for example be in the form of fine particles, e.g., 5 μm or less, that are dry blended with the composite particles, and furthermore, may be present at a relative low concentration in the powder bed material, e.g., from 0.01 wt % to 2 wt % or from 0.2 wt % to 1 wt %.

In some examples, the composite particles can be colorless. For example, the composite particles can have a white, translucent, or transparent appearance. When used with a colorless fusing agent, the powder bed can provide a printed part that is white, translucent, or transparent. In other examples, the powder bed material can be colored by adding colorant with the polyamide-12 polymer for producing colored parts. In still other examples, when the powder bed material is white, translucent, or transparent, color can be imparted to the part by the fusing agent or another colored fluid or ink.

The composite particles can also, in some cases, be blended with a filler. The filler can include inorganic particles such as alumina, silica, glass, and/or other similar fillers. When the composite particles fuse together, the filler particles can become embedded in the polymer, adding filler to the composite material to form a secondary composite. In some examples, the filler can include a free-flow filler, anti-caking filler, or the like. Such fillers can prevent packing of the composite particles, coat the coat the composite particles further, smooth edges to reduce inter-particle friction, and/or absorb moisture. In some examples, a weight ratio of composite particles to filler particles can be from 99:1 to 1:2, from 10:1 to 1:1, or from 5:1 to 1:1.

Material sets in accordance with the present technology can also include a fusing agent. The fusing agent can contain an energy absorber that is capable of absorbing electromagnetic radiation to produce heat. The energy absorber can be colored or colorless. In various examples, the energy absorber can include carbon black, near-infrared absorbing dyes, near-infrared absorbing pigments, tungsten bronzes, molybdenum bronzes, metal nanoparticles, conjugated polymers, or combinations thereof.

Examples of near-infrared absorbing dyes include aminium dyes, tetraaryldiamine dyes, cyanine dyes, pthalocyanine dyes, dithiolene dyes, and others. In further examples, the energy absorber can be a near-infrared absorbing conjugated polymer such as poly(3,4-ethylenedioxythiophene)-poly(styrenesulfonate) (PEDOT: PSS), a polythiophene, poly(p-phenylene sulfide), a polyaniline, a poly (pyrrole), a poly(acetylene), poly(p-phenylene vinylene), polyparaphenylene, or combinations thereof.

As mentioned, the energy absorber can include a conjugated polymer. As used herein, "conjugated" refers to alternating double and single bonds between atoms in a molecule. Thus, "conjugated polymer" refers to a polymer that has a backbone with alternating double and single bonds. In many cases, the energy absorber can have a peak absorption wavelength in the range of 800 nm to 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In some examples, the fusing agent can have a black or gray color due to the use of carbon black as the energy absorber. Thus, carbon black is good choice for use as an energy absorber when a colored part is intended, e.g., black or gray or other color mixed with black or gray. However, in other examples the fusing agent can be colorless or nearly colorless. The concentration of the energy absorber can be adjusted to provide a fusing agent in which the visible color of the fusing agent is not substantially altered by the energy absorber. Although some of the above described energy absorbers have low absorbance in the visible light range, the absorbance is usually greater than zero. Therefore, the energy absorbers can typically absorb some visible light, but their color in the visible spectrum can be minimal enough that it does not substantially impact the fusing agent's ability to take on another color when a colorant is added (unlike carbon black which dominates the fluid color with gray or black tones). The energy absorbers in concentrated form can have a visible color, but the concentration of the energy absorbers in the fusing agent can be adjusted so that the energy absorbers are not present in such high amounts that they alter the visible color of the fusing agent. For example, an energy absorber with a very low absorbance of visible light wavelengths can be included in greater concentrations compared to an energy absorber with a relatively higher absorbance of visible light. These concentrations can be adjusted based on a specific application with some experimentation. In one example, the energy absorber can have a concentration in the fusing agent such that after the fusing agent is printed onto the polymer powder, the amount of energy absorber in the polymer powder can be from 0.0003 wt % to 10 wt %, or from 0.005 wt % to 5 wt %, with respect to the weight of the polymer powder.

The amount of energy absorber in the fusing agent can vary depending on the type of energy absorber. In some examples, the concentration of energy absorber in the fusing agent can be from 0.1 wt % to 20 wt %. In one example, the concentration of energy absorber in the fusing agent can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %. In one example, the concentration of the energy absorber can be high enough that the energy absorber impacts the color of the fusing agent, but low enough that when the fusible agent is printed on the powder bed material, the energy absorber does not substantially impact the color of the powder. Thus, in this example, the concentration of the energy absorber can be balanced with the amount of fusing agent that is to be printed on the polymer powder so that the total amount of energy absorber that is printed onto the polymer powder is low enough that the visible color of the polymer powder is not impacted. That being mentioned, there may also be cases where the energy absorber is selected so that a deliberate color is provided to the printed part. Carbon black is an example of such an energy absorber.

The energy absorber can have a temperature boosting capacity sufficient to increase the temperature of the polymer coating on the composite particle above the melting or softening point of the polymer. As used herein, "temperature boosting capacity" refers to the ability of an energy absorber to convert electromagnetic radiation, e.g., infrared or near-infrared light energy, into thermal energy to increase the temperature of the printed powder bed material (containing the glass beads coated with the polyamide-12 polymer) over and above the temperature of the unprinted portion of the composite particles. Typically, the composite particles can be fused together when the temperature increases to the melting or softening temperature of the polymer. As used herein, "melting point" refers to the temperature at which a polymer transitions from a crystalline phase to a pliable more amorphous phase. Some polymers do not have a melting point, but rather have a range of temperatures over which the polymers soften. This range can be segregated into a lower softening range, a middle softening range, and an upper softening range. In the lower and middle softening ranges, the coating of the composite particles can coalesce to form a part while the remaining composite particles remain loose. If the upper softening range is used, the whole powder bed can become a cake. The "softening point," as used herein, refers to the temperature at which the polyamide-12 polymer coalesces in the presence of the energy absorber while the remaining composite particles remain separate and loose, typically suitably so for recycling. Although melting point and softening point are often described herein as the temperatures for coalescing the polymer coating, in some cases the polymer coatings can coalesce together at temperatures slightly below the melting point or softening point. Therefore, as used herein "melting point" and "softening point" can include temperatures slightly lower, such as up to about 20° C. lower, than the actual melting point or softening point. When the fusing agent is printed on a portion of the composite particles, the energy absorber can heat the printed portion to a temperature at or above the melting or softening point of the polyamide-12 polymer coating, while the unprinted portions of the composite particles remain below the melting or softening point of the polymer coating. This allows the formation of a solid 3D printed part, while the loose particles can be easily separated from the finished printed part.

In accordance with examples of the present disclosure, the unused powder bed material, which includes the composite particles, can be readily recycled for future part printing jobs. Because the polyamide-12 polymer coating described herein is stable when exposed to heat, the powder bed material can be refreshed by adding only minimal amounts of fresh powder bed material. For example, by refreshing the powder bed material with as little as 30 wt %, 20 wt %, or 10 wt % fresh powder, the powder bed material can be heated or cooled (or build cycled) more than 4 times, more than 6 times, more than 8 times, or more than 10 times. Each instance of heating and cooling can be referred to as one "cycle." In one example, the powder can be cycled 10 times, only refreshing the powder bed material using 20 wt % fresh powder (or less) added for each new cycle.

One reason for the recyclability of the polyamide-12 powder even under heat stress as described herein may be related to the higher concentration of carboxy end groups compared to amino end groups. When they are about the same, post-condensation can occur more readily, thus increasing the solution viscosity of the polyamide in the construction process. Furthermore, under reaction conditions, the loss of amino groups due to uncontrolled side reactions can lead to crosslinking reactions from thermally generated oxidation. Recyclability may also be helped by grain boundaries, and thus, particle size can contribute to the stability. There can typically be less reaction within the grain compared to melted regions.

Returning to the energy absorber per se, the energy absorber can have a temperature boosting capacity from about 10° C. to about 70° C. for the polyamide-12 polymer, which has a melting or softening point from about 160° C. to about 200° C., for example. If the powder bed material is at a temperature within about 10° C. to about 70° C. of the melting or softening point, then such an energy absorber can boost the temperature of the powder bed material up to the melting or softening point, while the unprinted powder remains at a lower temperature. In some examples, the powder bed material can be preheated to a temperature from about 10° C. to about 70° C. lower than the melting or softening point of the polymer. The fusing agent can then be printed onto the powder bed material and the powder bed can be irradiated with electromagnetic radiation (suitable matched to the thermal excitation frequency of the energy absorber) to coalesce the printed portion of the powder bed material (which includes the composite particles).

In further examples, the material set can include colored fluids or inks for adding color to the thermoplastic polymer powder. The colored fluids or inks can include any suitable colorant, including dyes and/or pigments. This can allow for printing of full-color 3-dimensional parts. In one example, the material set can include cyan, magenta, yellow, and/or black inks in addition to the fusing agent and other fluids or inks, if present. Alternatively, even the fusing agent itself can also include a pigment or dye colorant that imparts a visible color to the fusing agent. In still other examples, the colorant may also be the same as the energy absorber itself, e.g., carbon black.

In either example, whether the colorant is present in a separate fluid or in the fusing agent per se, if present, the colorant can be included in an amount from 0.1 wt % to 10 wt % in the fluid, ink, or agent. In one example, the colorant can be present in an amount from 0.5 wt % to 5 wt %. In another example, the colorant can be present in an amount from 2 wt % to 10 wt %. In some examples, the colored inks can be used to print 3D parts that retain the natural color of the polymer powder, or a polymer powder that is already colored to some degree. Additionally, in one example, the fluid, inks, or fusible agent can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow 5GT, Igrantee Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the above described fusing agent and/or inks, and thus ultimately, the printed part.

The components of the above described fluids, e.g., colored inkjet inks and fusing agents, can be selected to give the respective fluids good fluid jetting performance and the ability to fuse the powder bed material and/or color the composite particles with good optical density. Thus, these fluids can include a liquid vehicle and colorant. In some examples, the liquid vehicle formulation can include one or more co-solvents present in total at from 1 wt % to 50 wt %, depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can include dispersants in an amount from 5 wt % to 20 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble energy absorber can be used with an aqueous vehicle. Because the energy absorber is dispersible or soluble in water, an organic co-solvent may not be present, as it may not be included to solubilize the energy absorber. Therefore, in some examples, the fluids can be substantially free of organic solvent, e.g., predominantly water. However, in other examples a co-solvent can be used to help disperse other dyes or pigments, or improve the jetting properties of the respective fluids. In still further examples, a non-aqueous vehicle can be used with an organic-soluble or organic-dispersible energy absorber.

In certain examples, a high boiling point co-solvent can be included in the various fluids. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present in the various fluids at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, one or more surfactant can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, as mentioned, various other additives can be employed to improve certain properties of the fluid compositions for specific applications. Examples of these additives are those added to inhibit the growth of harmful microorganisms. These additives may be biocides, fungicides, and other microbial agents, which can be used in ink various formulations. Examples of suitable microbial agents include, but are not limited to, NUOSEPT® (Nudex, Inc.), UCAR-CIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the fluid. From 0.01 wt % to 2 wt %, for example, can be used. Viscosity modifiers and buffers may also be present, as well as other additives to modify properties of the fluid as desired. Such additives can be present at from 0.01 wt % to 20 wt %.

In addition to the material sets described above, the present technology also encompasses 3-dimensional printing systems that include the material sets. An example of a 3-dimensional printing system is shown in FIG. 1. The system 100 includes a powder bed 110 comprising a powder bed material 115. The powder bed material includes, as shown in detail in FIG. 2, composite particles 116 of glass beads 117 coated with polyamide-12 polymer 118. The glass bead can have an average particle size (A) from about 10 μm to 60 μm, and the composite particle as a whole can have an average particle size (B) of 30 μm to 70 μm.

Returning now to FIG. 1, in the example shown, the powder bed 110 can include a build platform or moveable floor 120 that allows the powder bed to be lowered after each layer of the 3-dimensional part is printed. The 3-dimensional part 127 is shown after printing the fusing agent 140 on the powder bed material. The system may also include a fluid jet printer 130 that includes a first fluid jet pen 135 in communication with a reservoir of the fusing agent. The first fluid jet pen can print the fusing agent onto the powder bed. A second fluid jet pen 145 can be in communication with a reservoir of a second fluid or ink 150, which may be a colored ink, for example. The second fluid jet pen can be configured to print the second fluid onto the powder bed. In some examples, the 3-dimensional printing system can also include additional fluid jet pens in communication with a reservoir of fluid to provide other colors and/or functionality.

After the fusing agent 140 has been printed onto the powder bed material 115, a fusing electromagnetic radiation source, such as a fusing lamp 160a or 160b can be used to expose the powder bed to electromagnetic radiation sufficient to fuse the composite particles that have been printed with the fusing agent. Thus, the electromagnetic radiation source can be a fusing lamp 160a, which can be a stationary fusing lamp that rests above the powder bed, and/or the fusing lamp 160b may be carried on a carriage with the fluid jet pens 135, 145. To print the next layer, the moveable floor is lowered and a new layer of powder bed material is added above the previous layer. Unused powder bed material, such as that shown at 115, is not used to form the 3-dimensional part, and thus, can be recycled for future use. Recycling can include refreshing the used powder bed material with a relatively small percentage of fresh powder bed material, e.g., as little as up to 30 wt % (1-30 wt %), up to 20 wt % (1-20 wt %), or up to 10 wt % (1-10 wt %).

To achieve good selectivity between the fused and unfused portions of the powder bed material, the fusing agents can absorb enough electromagnetic radiation or energy to boost the temperature of the thermoplastic polymer coating above the melting or softening point of the polymer, while unprinted portions of the powder bed material remain below the melting or softening point. Thus, as mentioned, the 3-dimensional printing system can include preheaters for preheating the powder bed material, and particularly the polyamide-12 polymer coating, to a temperature near the melting or softening point. In one example, the system can include a preheater(s) to heat the powder bed material prior to printing. For example, the system may include a print bed heater 174 to heat the print bed to a temperature from 100° C. to 160° C., or from 120° C. to 150° C. The system can also include a supply bed or container 170 which may also includes a supply heater 172 at a location where the powder bed material including the composite particles are stored before being spread in a layer onto the powder bed 110. The supply bed or container can utilize the supply heater to heat the supply bed or container to a temperature from 90° C. to 140° C. Thus, when an overhead heating source 176, e.g., heating lamps, are used to heat up the powder bed material to a printing temperature, the typical minimum increase in temperature for printing can be carried out quickly, e.g., up to about 160° C. to 220° C. in some examples. To be clear, the overhead heating source used to heat the powder bed material for printing is typically a different energy source than the electromagnetic radiation source, e.g., fusing lamp 160a or 160b, used to thermally activate the energy absorber, though these energy sources could be the same depending on the energy absorber and powder bed material chosen for use.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure used to coalesce each printed layer. The fusing lamp can be configured to irradiate the entire powder bed with a substantially uniform amount of energy. This can selectively coalesce the printed portions with fusing agents leaving the unprinted portions of the powder bed material below the melting or softening point.

In one example, the fusing lamp can be matched with the energy absorbers in the fusing agents so that the fusing lamp emits wavelengths of light that match the peak absorption wavelengths of the energy absorbers. An energy absorber with a narrow peak at a particular infrared or near-infrared wavelength can be used with a fusing lamp that emits a narrow range of wavelengths at approximately the peak wavelength of the energy absorber. Similarly, an energy absorber that absorbs a broad range of near-infrared wavelengths can be used with a fusing lamp that emits a broad range of wavelengths. Matching the energy absorber and the fusing lamp in this way can increase the efficiency of coalescing the polyamide-12 polymer coating with the energy absorber printed thereon, while the unprinted polymer particles do not absorb as much light and remain at a lower temperature.

Depending on the amount of energy absorber present in the powder bed material, the absorbance of the energy absorber, the preheat temperature, and the melting or softening point of the polyamide-12 polymer coated on the glass beads, an appropriate amount of irradiation can be supplied from the fusing lamp. In some examples, the fusing lamp can irradiate individual layers from about 0.5 to about 10 seconds per pass, e.g., using one or multiple passes which can depend in part on the speed of a pass or passes.

Figure 3:
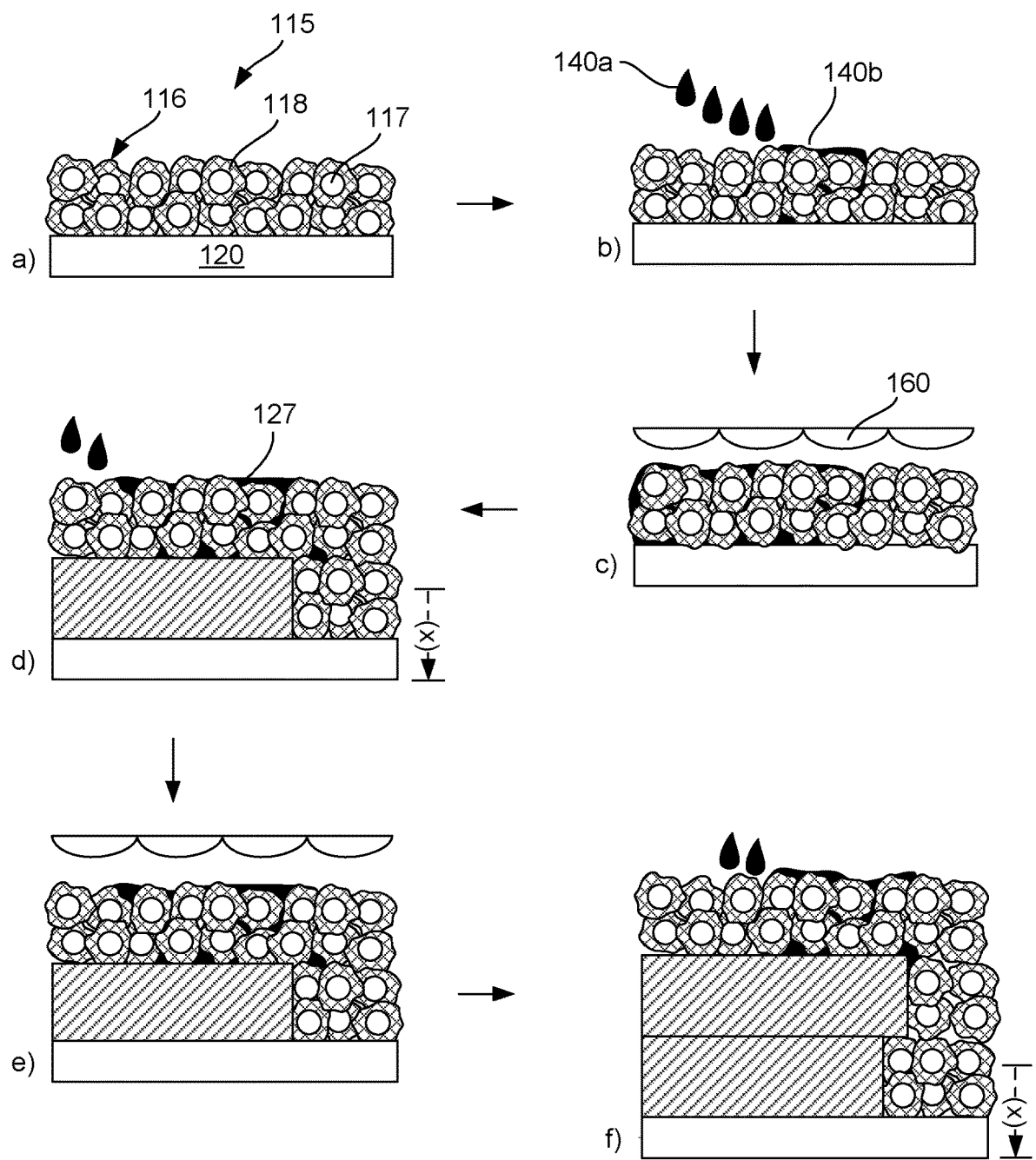
FIG. 3 is a schematic view of an example printing system and example initial schematic representation of a 3-dimensional printed part printed using an example material set in accordance with the present disclosure.

Turning now to the building a 3-dimensional part as described herein as well as example material sets for building 3-dimensional parts, FIG. 3 provides a specific example of the present disclosure. It is noted that there are six steps shown (a-f) in FIG. 3 that exemplify aspects of the disclosure, but this is provided merely for convenience in describing the present technology. Fewer or greater number of steps can be carried out, as desired for a particular application. Further, for brevity, some steps in FIG. 3 are shown in aggregate. For example step d) in FIG. 3 shows multiple steps together, unlike the separated steps shown in steps a) to c). Additionally, similar structures shown in steps a) to f) are labeled with reference numerals once, but such reference numerals are applicable throughout all of FIG. 3.

With specific reference to FIG. 3, a) shows a build platform or movable floor 120, to which is deposited a thin layer of powder bed material 115, which can include the composite particles 116 of glass beads 117 coated with polyamide-12 polymer 118, anti-oxidant, fillers (not shown), etc. Next, b) shows droplets of a fusing agent 140a as well as already deposited fusing agent 140b applied to and within a portion of the powder bed material. The fusing agent thus admixes and fills voids within the powder bed material, as shown in c), where the fusing agent and powder bed material are fused to form a fused part layer 127, and the movable floor is moved downward a distance of (x) corresponding to a 3-dimensional fused part layer thickness (e.g., 20 μm to 200 μm). The process is then repeated as many times as desired to form a 3-dimensional part, as shown in steps d) to f). In other words, the powder bed material in this example is spread thinly (20 μm to 200 μm) on the movable floor, combined with fusing agent, fused with electromagnetic energy, the moveable floor dropped, and the process repeated with the prior layer acting as the movable floor for the subsequently applied layer. As can be seen, the second fusible part layer of the "in progress" 3-dimensional part shown at f) is supported by the fusible part layer as well as by some of the fused powder bed material, where the second layer may hang out or cantilever out beyond the first layer. Once the 3-dimensional part is built, unfused powder bed material may be collected and reused or recycled as described herein. Notably, FIG. 3 does not show any of the heating mechanisms that may be present, including a heater for the movable floor, a heater for the powder bed material supply, or overhead heaters that likewise may also be present. These heaters may also be present.

The 3-dimensional part prepared as described herein can be formed of multiple layers of fused polymer (with glass beads suspended therein) stacked in a Z axis direction. The Z axis refers to an axis orthogonal to the x-y plane. For example, in 3-dimensional printing systems having a powder bed floor that lowers after each layer is printed, the Z axis is the direction in which the floor is lowered. The 3-dimensional printed part can have a number of surfaces that are oriented partially in the Z axis direction, such as pyramid shapes, spherical shapes, trapezoidal shapes, non-standard shapes, etc. Thus, virtually any shape that can be designed and which can be self-supporting as a printed part can be crafted.

Figure 2:
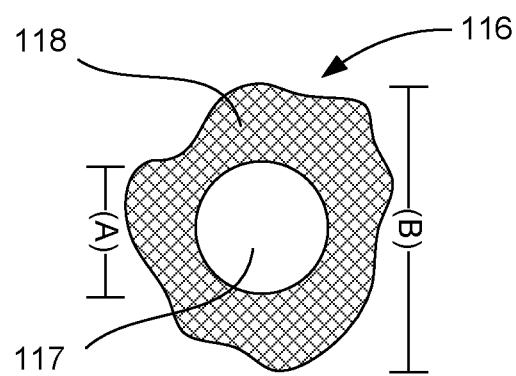
FIG. 2 is a schematic view of an example of composite particles of glass beads coated with polyamide-12 polymer.

In further detail in examples related to FIGS. 1-3, a 3-dimensional printed part can be formed as follows. A fluid jet printer can be used to print a first pass of fusing agent onto a first portion of the powder bed material. In some cases, there will be other fluid pens, such as colored inks or other functional fluids. This can be done on one pass, two passes, three passes, etc. (back and forth may be considered two passes). If the electromagnetic radiation source is not a bar that sits overhead (which can be left in an on position, or cycled to turn on and off at appropriate times relative to fusing agent application), but rather is associated with the printing carriage, a curing pass can then be performed by passing a fusing lamp over the powder bed to fuse the composite particles with the fusing agent. Multiple curing passes may be used in some examples. Individual passes of printing and curing can be followed by further deposit of the powder bed material.

It is noted that, as used in this specification and the appended claims, the singular forms "a," "an," and "the" include plural referents unless the context clearly dictates otherwise.

As used herein, "liquid vehicle" refers to a liquid in which additives are placed to form fluid jettable formulations, such as fusing agent, inks, functional fluids, etc. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and energy absorbers, the liquid vehicle can carry solid additives such as polymers, latexes, UV curable materials, plasticizers, salts, etc.

The term "fluid" herein does not exclude solid additives that may be suspended therein, as fluid generally includes both solutions and fine dispersions, such as in fusing agents, inks, functional fluids, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 0.1 wt %.

As used herein, "fluid jetting" or "jetting" refers to compositions that are ejected from jetting architecture, such as inkjet architecture or fluid jet architecture, e.g., thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLE

The following illustrates various examples of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Solution Viscosity Before and After Aging

A polyamide-12 powder having an average particle size of about 56 μm and a fresh solution viscosity of 1.78 (prior to heat aging) was then heat aged at 165 C for 20 hours in air. The resulting solution viscosity after aging was about 1.77, indicating that the polyamide-12 polymer was very stable from exposure to heat.

Example 2—Strength, Elongation, and Modulus Comparison

A first powder bed material was prepared that included composite particles of glass beads coated with polyamide-12 polymer of Example 1 (referred to as "Composite Particles"). Furthermore, as a comparative, the polyamide-12 powder of Example 1 was dry blended (without coating) with glass beads (referred to as "Dry Blended Particles"). Additionally, the polyamide-12 powder of Example 1 was evaluated (without added glass beads) as an additional comparative (referred to as "Polyamide Particles"). As mentioned in Example 1, the initial solution viscosity for the polyamide-12 polymer was about 1.78. The polyamide-12 polymer also had greater than 80 meq/g carboxylic end groups and less than 40 meq/g amino end groups.

The powder bed materials were tested for strength, elongation, and modulus along the X-Y axis (in line with the direction of the layers) and along the Z axis (perpendicular with the direction of the layers). The fusing agent used for the additive 3-dimensional printing was a carbon black-based fusing agent that included 5 wt % carbon black and a suitable liquid vehicle for jetting the fusing agent onto the respective powder bed material layers. In essence, the printer powder supply and powder bed were filled with the various powder bed materials, the supply temperature was set at about 130° C., and the print bed temperature was set at 160° C. A heater under the print bed was set at 155° C. Both print speed and curing speed were set at 2×15 inches per second (ips). The fusing agent was printed in the 1$^{st}$ pass, while curing was performed in 1$^{st}$, 2$^{nd}$ and 3$^{rd}$ passes using two 300 W bulbs placed approximately 1 cm away from the surface of the powder bed.

Essentially, each sample prepared included 600 fused layers which were printed at about a 100 µm thickness, and the respective strength, elongation at break, and modulus were measured for both the X-Y axis and the Z axis, using a tensile test following a standard procedure as described in ASTM D638 (Standard Test Method for Tensile Properties of Plastics, ASTM International, West Conshohocken, Pa.). Before carrying out the tensile testing protocol, all samples were pre-conditioned at 23° C. and 50% relative humidity for least 24 hours after being built. In the tensile test, a pull speed of 1 mm/min was applied and an extensometer was used to gauge the true strain of samples within the gauge length.

The data for each test is shown in Tables 1 and 2 below:

TABLE 1

| X-Y Axis | | | |
|---|---|---|---|
| | Composite Particles | Dry Blended Particles | Polyamide Particles |
| Strength (MPa) | 28 | 30 | 43 |
| Elongation (%) | 17 | 6 | 29 |
| Modulus (MPa) | 2500 | 2700 | 1352 |

TABLE 2

| Z Axis | | | |
|---|---|---|---|
| | Composite Particles | Dry Blended Particles | Polyamide Particles |
| Strength (MPa) | 27 | 24 | 35 |
| Elongation (%) | 9 | 5 | 5.3 |
| Modulus (MPa) | 3300 | 2800 | 1475 |

As can be seen from Tables 1 and 2, the Composite Particles and the Dry Blended Particles have about the same strength and modulus along the X-Y axis and Z axis. However, the Composite Particles provided a significantly improved elongation (elongation to break) along the X-Y axis and along the Z axis. Additionally, the Composite Particles have significantly improved modulus compared the neat polyamide particles.

Example 3—Stability

Furthermore, another benefit of composite particles used in the present example relates to recyclability (or reusability) of its un-used powder bed material. Two batches or runs of the polyamide-12 polymer coated glass beads were evaluated for heat stability using Melt Flow Index (MFI). MFI is used because rather than solution viscosity because once the polyamide-12 polymer is coated on the glass beads, solution viscosity is difficult to measure. Thus, MFI was measured for fresh coated beads as well as for coated beads after exposure to 165° C. for 20 hours in air. MFI was conducted per ASTM D1238-13 at 235° C. using 5.0 kg of weight (ASTM International, West Conshohocken, Pa.; 2014). Essentially, the values in Table 3 below provide the volume in cubic centimeter (CC) of the materials that are extruded from a standard die in 10 min at 235° C. under 5.0 kg of weight. Table 3 below presents the data, as follows:

TABLE 3

| Heat Stability | | | | |
|---|---|---|---|---|
| | Fresh | | Aged at 165° C./ 2 hrs/air | |
| | Run 1 | Run 2 | Run 1 | Run 2 |
| 235° C./5.0 kg | 29.4 | 29.5 | 26.4 | 27.7 |

As shown in Table 3, the MFI values after heat exposure is only slightly below the values of fresh polymer coated beads, which indicates that the molecular weight of polyamide-12 in the composite was kept about the same or only slightly increased after heat exposure.

What is claimed is:

1. A material set, comprising:
    a powder bed material, comprising composite particles including glass beads coated with polyamide-12 polymer, wherein the composite particles have an average particle size from 20 µm to 200 µm, wherein the polyamide-12 polymer includes greater than 80 meq/g carboxylic end groups and less than 40 meq/g amino end groups; and
    a fusing agent comprising an energy absorber capable of absorbing electromagnetic radiation to produce heat.

2. The material set of claim 1, wherein the polyamide-12 polymer has a solution viscosity from 1.7 to 1.9 at room temperature.

3. The material set of claim 2, wherein the solution viscosity changes by no greater than about 5% when exposed to 165° C. for 20 hours in air.

4. The material set of claim 1, wherein the particle size distribution of the composite particles is as follows:
    D50 is from 40 µm to 60 µm,
    D10 is from 15 µm to 45 µm, and
    D90 is from 70 µm to 90 µm.

5. The material set of claim 1, wherein the energy absorber comprises a carbon black pigment, a near-infrared absorbing dye, a near-infrared absorbing pigment, a tungsten bronze, a molybdenum bronze, metal nanoparticles, or a conjugated polymer, or a combination thereof.

6. The material set of claim 1, wherein the powder bed material further includes an anti-oxidant powder admixed with the composite particles.

7. The material set of claim 1, wherein the glass beads have an average size from 10 µm to 60 µm.

8. A 3-dimensional printing system, comprising:
    a powder bed comprising composite particles include glass beads coated with polyamide-12 polymer, wherein the composite particles have an average particle size from 20 µm to 200 µm, and wherein the polyamide-12 polymer includes greater than 80 meq/g carboxylic end groups and less than 40 meq/g amino end groups;

a fluid jet printer comprising a fluid jet pen in communication with a reservoir of a fusing agent to print the fusing agent onto the powder bed, wherein the fusing agent comprises an energy absorber capable of absorbing electromagnetic radiation to produce heat; and a fusing electromagnetic radiation source to expose the powder bed material to electromagnetic radiation sufficient to fuse polyamide-12 polymer that has been printed with the fusing agent, but which does not fuse the polyamide-12 polymer not printed with the fusing agent.

9. The system of claim 8, wherein the polyamide-12 polymer has a solution viscosity from 1.7 to 1.9 at room temperature, and wherein the solution viscosity changes by no greater than about 5% when exposed to 165° C. for 20 hours in air.

10. The system of claim 8, wherein the particle size distribution of the composite particles is as follows:
D50 is from 40 μm to 60 μm,
D10 is from 15 μm to 45 μm, and
D90 is from 70 μm to 90 μm.

11. The system of claim 8, wherein the powder bed material further includes an anti-oxidant powder admixed with the composite particles.

12. The system of claim 8, wherein the energy absorber comprises a carbon black, a near-infrared absorbing dye, a near-infrared absorbing pigment, a tungsten bronze, a molybdenum bronze, metal nanoparticles, or a conjugated polymer, or a combination thereof.

13. The system of claim 8, wherein the electromagnetic radiation source emits infrared or near-infrared radiation sufficient to heat the energy absorber in the fusing agent.

14. A 3-dimensional printed part, comprising
a part body comprising multiple layers of energy absorber and powder bed material fused together at individual layer thicknesses from 20 μm to 200 μm,
wherein the powder bed material used to prepare the printed part comprises composites particles including glass beads coated with polyamide-12 polymer,
wherein the composited particles have an average particle size from 20 μm to 200 μm, and
wherein the polyamide-12 polymer includes greater than 80 meq/g carboxylic end groups and less than 40 meq/g amino end groups.

15. The 3-dimensional printed part of claim 12, wherein the X-Y axis elongation is from 5% to 30%, the Z-axis elongation is from 2% to 20%, the tensile strength in both X-Y axis and Z axis is from 25 MPa to 45 MPa, and the tensile modulus in both X-Y axis and Z axis is from 2000 MPa to 3500 MPa.

* * * * *